(12) United States Patent
Shiratori et al.

(10) Patent No.: US 9,926,221 B2
(45) Date of Patent: Mar. 27, 2018

(54) NEAR INFRARED CUTOFF FILTER GLASS

(71) Applicant: ASAHI GLASS COMPANY, LIMITED, Chiyoda-ku (JP)

(72) Inventors: Makoto Shiratori, Haibara-gun (JP); Takeshi Yamaguchi, Haibara-gun (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/250,010

(22) Filed: Aug. 29, 2016

(65) Prior Publication Data

US 2016/0363703 A1 Dec. 15, 2016

Related U.S. Application Data

(63) Continuation of application No. PCT/JP2015/059996, filed on Mar. 30, 2015.

(30) Foreign Application Priority Data

Apr. 9, 2014 (JP) ................. 2014-080044

(51) Int. Cl.
| | |
|---|---|
| C03C 3/247 | (2006.01) |
| G02B 5/20 | (2006.01) |
| C03C 4/08 | (2006.01) |
| G02B 5/22 | (2006.01) |

(52) U.S. Cl.
CPC .............. *C03C 3/247* (2013.01); *C03C 4/082* (2013.01); *G02B 5/208* (2013.01); *G02B 5/226* (2013.01); *C03C 2204/00* (2013.01)

(58) Field of Classification Search
CPC .............. C03C 3/247; C03C 4/08; G02B 5/22
See application file for complete search history.

(56) References Cited

U.S. PATENT DOCUMENTS

| | | | |
|---|---|---|---|
| 2004/0082460 A1* | 4/2004 | Yamane | C03C 3/16 501/48 |
| 2012/0165178 A1 | 6/2012 | Ritter et al. | |
| 2012/0241697 A1 | 9/2012 | Ohkawa et al. | |

FOREIGN PATENT DOCUMENTS

| | | |
|---|---|---|
| JP | 1-219037 | 9/1989 |
| JP | 2004-83290 | 3/2004 |
| JP | 2004-137100 | 5/2004 |
| JP | 2010-52987 | 3/2010 |
| JP | 2011-93757 | 5/2011 |
| JP | 2011162409 A * | 8/2011 |
| JP | 2012-148964 | 8/2012 |
| WO | WO 2011/071157 A1 | 6/2011 |

OTHER PUBLICATIONS

International Search Report dated Jun. 30, 2015 in PCT/JP2015/059996, filed on Mar. 30, 2015.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

To provide a near infrared cutoff filter glass which is excellent in optical properties such that the transmittance of visible light is high, and the transmittance of near infrared light is low. A near infrared cutoff filter glass comprising components of P, F, Al, R (R is at least one member selected from Li, Na and K), R' (R' is at least one member selected from Mg, Ca, Sr, Ba and Zn) and Cu, wherein ($Cu^+$/the total amount of Cu)×100[%] is within a range of from 0.01 to 4.0%.

10 Claims, No Drawings

NEAR INFRARED CUTOFF FILTER GLASS

This application is a continuation of PCT Application No. PCT/JP2015/059996 filed on Mar. 30, 2015, which is based upon and claims the benefit of priority from Japanese Patent Application No. 2014-080044 filed on Apr. 9, 2014. The contents of those applications are incorporated herein by reference in their entireties.

TECHNICAL FIELD

The present invention relates to a near infrared cutoff filter glass which is used for a color calibration filter of e.g. a digital still camera or a color video camera, which is particularly excellent in light transmittance of visible light.

BACKGROUND ART

A solid state imaging sensor such as a CCD or a CMOS used for e.g. a digital still camera has a spectral sensitivity covering from the visible region to the near infrared region in the vicinity of 1,200 nm. Accordingly, since no good color reproducibility will be obtained as it is, the luminosity factor is corrected by using a near infrared cutoff filter glass having a specific substance which absorbs infrared rays added. As such a near infrared cutoff filter glass, an optical glass having Cu added to fluorophosphate glass, in order to selectively absorb wavelengths in the near infrared region and to achieve a high weather resistance, has been developed and used. As such glass, the compositions are disclosed in Patent Documents 1 to 3.

PRIOR ART DOCUMENTS

Patent Documents

Patent Document 1: JP-A-1-219037
Patent Document 2: JP-A-2004-83290
Patent Document 3: JP-A-2004-137100

DISCLOSURE OF INVENTION

Technical Problem

Cameras, etc. in which a solid state imaging sensor is mounted are being miniaturized and thinned. Being accompanied with it, it is desired to miniaturize and thin imaging devices and their mounted devices similarly. In a case where a near infrared cutoff filter glass having Cu added to fluorophosphate glass is made to be thin, it is necessary to increase the concentration of Cu component which influence on optical properties. However, if the concentration of Cu component in glass is increased, although the desired optical property at an infrared ray side can be obtained, the transmittance of light at a visible light region deteriorates, such being problematic.

It is an object of the present invention to provide a near infrared cutoff filter glass which is excellent in optical properties such that even though the concentration of Cu component in glass becomes high in order to make the glass to be thin, the transmittance of visible light is high, and the transmittance of near infrared light is low.

Solution to Problem

As a result of extensive studies, the present inventors have found that by strictly controlling the valence of Cu component in glass, a near infrared cutoff filter glass having optical properties much superior to conventional glass can be obtained.

That is, the near infrared cutoff filter glass of the present invention comprises components of P, F, Al, R (R is at least one member selected from Li, Na and K), R' (R' is at least one member selected from Mg, Ca, Sr, Ba and Zn) and Cu, wherein ($Cu^+$/the total amount of Cu)×100[%] is within a range of from 0.01 to 4.0%.

Further, as a preferred embodiment of the near infrared cutoff filter glass of the present invention, the numerical value obtained by dividing the absorption coefficient at a wavelength of 400 nm by the absorption coefficient at a wavelength of 800 nm is within a range of from 0.00001 to 0.02.

Further, as a preferred embodiment of the near infrared cutoff filter glass of the present invention, in a thickness of 0.3 mm, the spectral transmittance at a wavelength of 400 nm is from 83 to 92%.

Further, as a preferred embodiment of the near infrared cutoff filter glass of the present invention, the glass comprises as represented by cation %,
$P^{5+}$: from 30 to 50%,
$Al^{3+}$: from 5 to 20%,
$R^+$: from 20 to 40% (wherein $R^+$ is the total amount of $Li^+$, $Na^+$ and $K^+$), $R'^{2+}$: from 5 to 30% (wherein $R'^{2+}$ is the total amount of $Mg^{2+}$, $Ca^{2+}$, $Sr^{2+}$, $Ba^{2+}$ and $Zn^{2+}$),
$Cu^{2+}$: from 0.1 to 15% and
$Sb^{3+}$: from 0 to 1%;
and as represented by anion %,
$O^{2-}$: from 30 to 90% and
$F^-$: from 10 to 70%.

The expression "to" showing the numerical range is used to include the numerical values before and after thereof as the lower limit value and the upper limit value, and hereinafter in this specification, "to" is used to have the same meaning unless otherwise specified.

Advantageous Effects of Invention

According to the present invention, a near infrared cutoff filter glass which is excellent in optical properties such that the transmittance of visible light is high, and the transmittance of near infrared light is low, can be obtained.

DESCRIPTION OF EMBODIMENTS

The near infrared cutoff filter glass of the present invention (hereinafter referred to also as glass of present invention) is glass comprising components of P, F, Al, R (R is at least one member selected from Li, Na and K, i.e. R represents an alkali metal of Li, Na or K and represents containing at least one member selected from them), R' (R' is at least one member selected from Mg, Ca, Sr, Ba and Zn, i.e. R' represents an alkaline earth metal of Mg, Ca, Sr, Ba or Zn and represents containing at least one member selected from them) and Cu, wherein ($Cu^+$/the total amount of Cu)×100[%] is from 0.01 to 4.0%.

In the expression of ($Cu^+$/the total amount of Cu), $Cu^+$ is represented by wt %, and the total amount of Cu is the total amount of Cu including monovalent, bivalent and other valencies and represented by wt %. That is, the content of $Cu^+$ and the total amount of Cu are represented by wt % of $Cu^+$ and the total amount of Cu in the glass, when the glass of the present invention is 100 wt %.

In the near infrared cutoff filter glass, it is necessary to let the Cu component in the glass be present in the form of $Cu^{2+}$ (bivalent), since the Cu component absorbs light having a wavelength in the region of the near infrared. However, when molten glass becomes to be in the reduced state, the proportion of $Cu^+$ (monovalent) having an absorption property in the vicinity of the wavelength of from 300 to 600 nm increases, whereby the transmittance in the vicinity of the wavelength of 400 nm becomes low. Thus, the proportion of $Cu^+$ per the total amount of Cu is controlled to be from 0.01 to 4.0%, whereby while suppressing the transmittance in the vicinity of the wavelength of 400 nm from becoming low, light having a wavelength of at least 700 nm can be absorbed.

When ($Cu^+$/the total amount of Cu)×100[%] in the Cu component in the glass exceeds 4.0%, the transmittance in the vicinity of the wavelength of 400 nm becomes low, such being undesirable. If ($Cu^+$/the total amount of Cu)×100[%] in the Cu component in the glass is less than 0.01%, it is necessary to strictly control an atmosphere for molten glass, and thereby the production cost tends to be high. $Cu^+$/the total amount of Cu in the Cu component in the glass of the present invention is preferably from 0.01 to 3.5%, more preferably from 0.01 to 3.0%, further preferably from 0.01 to 2.5%, furthermore preferably from 0.01 to 2.0%, most preferably from 0.01 to 1.5%.

Regarding the Cu component in the glass, the amount of $Cu^+$ can be measured by the oxidation-reduction titration method, and the total amount of Cu can be measured by ICP spectrometry method.

The method for measuring the amount of $Cu^+$ by the oxidation-reduction titration method will be described below.

$NaVO_3$ as a reagent, HF and $H_2SO_4$ and a glass sample are added in a container, followed by heating, whereby $Cu^+$ reacts with $VO_3^-$ at 1:1. By the reaction, $Cu^+$ is oxidized to $Cu^{2+}$, and $VO_3^-$ is reduced to $VO^{2+}$. $FeSO_4$ as a reagent is dropwise added therein, whereby $Fe^{2+}$ reacts with $VO_3^-$ which is not reacted with $Cu^+$, and thereby $VO_3^-$ is reduced to $VO^{2+}$. Thus, the residual $VO_3^-$ can be estimated from the amount of the dropwise added $FeSO_4$, and from the difference between the amount of $VO_3^-$ in the original added reagent and the amount of the residual $VO_3^-$, the amount of $VO_3^-$ reacted with $Cu^+$ can be obtained. The amount of the reacted $VO_3^-$=the amount of $Cu^+$, since $Cu^+$ reacts with $VO_3^-$ at 1:1.

The glass of the present invention preferably has a numerical value obtained by dividing the absorption coefficient at a wavelength of 400 nm by the absorption coefficient at a wavelength of 800 nm within a range of from 0.00001 to 0.02.

The absorption coefficient is a constant showing how much a medium absorbs light, when light enters into the medium and has a dimension which is an inverse of the length. Based on Lamber-Beer law, the logarithm (absorbance) of the ratio of the intensity of light which passes through a medium for a certain distance and the intensity of light which enters is in proportion to a passing distance, and the proportion coefficient is called "absorption coefficient". That is, if the absorption coefficient is high, the amount of light which passes through glass is small, while if the absorption coefficient is low, the amount of light which passes through glass is large.

Light having a wavelength of 400 nm has a correlation with the content of $Cu^+$ in glass. The more the content of $Cu^+$ is, the higher the absorption coefficient is. Further, light having a wavelength of 800 nm has a correlation with the content of $Cu^{2+}$ in glass. The more the content of $Cu^{2+}$ is, the higher the absorption coefficient is. Thus, a near infrared cutoff filter glass preferably has a low absorption coefficient at a wavelength of 400 nm, and preferably has a high absorption coefficient at a wavelength of 800 nm. However, the absolute value of the absorption coefficient varies, depending on the content of Cu component in glass. Thus, the numerical value obtained by dividing the absorption coefficient at a wavelength of 400 nm by the absorption coefficient at a wavelength of 800 nm is made to be within a range of from 0.00001 to 0.02, whereby a near infrared cutoff filter glass having good balance of transmittance properties of visible region and near infrared region, can be obtained.

If the numerical value obtained by dividing the absorption coefficient at a wavelength of 400 nm by the absorption coefficient at a wavelength of 800 nm exceeds 0.02, the transmittance in the vicinity of the wavelength of 400 nm deteriorates, such being undesirable. If the numerical value is less than 0.0001, it is necessary to strictly control atmosphere for molten glass in order to lower the content of $Cu^+$, and thereby production cost tends to be high. The numerical value obtained by dividing the absorption coefficient at a wavelength of 400 nm by the absorption coefficient at a wavelength of 800 nm is more preferably from 0.0005 to 0.02, further preferably from 0.001 to 0.02, furthermore preferably from 0.002 to 0.018, particularly preferably from 0.003 to 0.016.

In the method for calculating the absorption coefficient of the present invention, the transmittance is measured in the form of a glass plate as described below, and the absorption coefficient calculated. Both surfaces of a glass plate are mirror polished, and the thickness "t" is measured. The spectral transmittance "T" of the glass plate is measured (for example, UV-visible/NIR spectrophotometer V-570, manufactured by JASCO Corporation is used). Then, the absorption coefficient "β" is calculated by means of the relational expression: $T=10^{-\beta t}$.

In the glass of the present invention, in a thickness of 0.3 mm, the spectral transmittance at a wavelength of 400 nm is preferably from 83 to 92%. In such a case, glass having a high transmittance to the visible light will be obtained.

If in a thickness of 0.3 mm, the spectral transmittance at a wavelength of 400 nm is lower than 83%, at a time of using such glass for an imaging device, the color tone may be impaired due to too low transmittance in the vicinity of the wavelength of 400 nm, such being undesirable. Further, if the spectral transmittance at the wavelength of 400 nm exceeds 92%, it is necessary to strictly control atmosphere for molten glass in order to lower the content of $Cu^+$, and thereby production cost tends to be high. In the thickness of 0.3 mm, the spectral transmittance at the wavelength of 400 nm is more preferably from 84 to 91%, further preferably from 85 to 90%.

The glass composition of the glass of the present invention preferably has as represented by cation %, $P^{5+}$: from 30 to 50%,
$Al^{3+}$: from 5 to 20%,
$R^+$: from 20 to 40% (wherein $R^+$ is the total amount of $Li^+$, $Na^+$ and $K^+$),
$R'^{2+}$: from 5 to 30% (wherein $R'^{2+}$ is the total amount of $Mg^{2+}$, $Ca^{2+}$, $Sr^{2+}$, $Ba^{2+}$ and $Zn^{2+}$),
$Cu^{2+}$: from 0.1 to 15% and
$Sb^{3+}$: from 0 to 1%;
and as represented by anion %,
$O^{2-}$: from 30 to 90% and
$F^-$: from 10 to 70%.

Now, the reason why the contents (represented by cation % and anion %) of components constituting the glass of the present invention are limited as described above will be described below.

In the present specification, unless otherwise specified, the contents and the total content of cationic components are represented as cation %, and the contents and the total content of anionic components are represented as anion %.

$P^{5+}$ is a main component to form glass and is an essential component to improve the near infrared cutting performance. However, if the content of $P^{5+}$ is less than 30%, no sufficient effect will be obtained, and if the content of $P^{5+}$ exceeds 50%, problems result such that glass becomes unstable, the weather resistance deteriorates, etc. The content of $P^{5+}$ is more preferably from 30 to 48%, further preferably from 32 to 48%, furthermore preferably from 34 to 48%.

$Al^{3+}$ is a main component to form glass and is an essential component to improve the weather resistance, etc. However, if the content of $Al^{3+}$ is less than 5%, no sufficient effect will be obtained, and if the content of $Al^{3+}$ exceeds 20%, problems result such that glass becomes unstable, the near infrared cutting performance deteriorates, etc., such being undesirable. The content of $Al^{3+}$ is more preferably from 6 to 18%, further preferably from 7 to 15%. Further, it is not preferred to use $Al_2O_3$ and $Al(OH)_3$ as a material for $Al^{3+}$, since problems result such that the molten temperature increases, molten products are formed, glass becomes unstable due to the reduction of the amount of $F^-$ to be charged, etc. Thus, $AlF_3$ is preferably used.

$R^+$ (wherein $R^+$ is the total amount of $Li^+$, $Na^+$ and $K^+$) is an essential component to lower the glass melting temperature, to lower the glass liquid phase temperature, to stabilize the glass, etc. However, if the content of $R^+$ is less than 20%, no sufficient effect will be obtained, and if the content of $R^+$ exceeds 40%, the glass tends to be unstable, such being undesirable. The content of $R^+$ is more preferably from 20 to 38%, further preferably from 22 to 38%, further more preferably from 24 to 38%. Here, $R^+$ is the total amount of $Li^+$, $Na^+$ and $K^+$ contained in glass, namely, $Li^+ + Na^+ + K^+$. Further, as $R^+$, at least one member selected from $Li^+$, $Na^+$ and $K^+$ is used.

$Li^+$ is a component to lower the glass melting temperature, to lower the glass liquid phase temperature, to stabilize the glass, etc. The content of $Li^+$ is preferably from 5 to 40%. However, if the content of $Li^+$ is less than 5%, no sufficient effect will be obtained, and if the content of $Li^+$ exceeds 40%, the glass tends to be unstable, such being undesirable. The content of $Li^+$ is more preferably from 8 to 38%, further preferably from 10 to 35%.

$Na^+$ is a component to lower the glass melting temperature, to lower the glass liquid phase temperature, to stabilize the glass, etc. The content of $Na^+$ is preferably from 5 to 40%. If the content of $Na^+$ is less than 5%, no sufficient effect will be obtained, and if the content of $Na^+$ exceeds 40%, the glass tends to be unstable, such being undesirable. The content of $Na^+$ is more preferably from 5 to 35%, further preferably from 5 to 30%.

$K^+$ is a component having effects to lower the glass melting temperature, to lower the glass liquid phase temperature, to stabilize the glass, etc. The content of $K^+$ is preferably from 0.1 to 30%. If the content of $K^+$ is less than 0.1%, no sufficient effect will be obtained, and if the content of $K^+$ exceeds 30%, the glass tends to be unstable. The content of $K^+$ is more preferably from 0.5 to 25%, further preferably from 0.5 to 20%.

$R'^{2+}$ (wherein $R'^{2+}$ is the total amount of $Mg^{2+}$, $Ca^{2+}$, $Sr^{2+}$, $Ba^{2+}$ and $Zn^{2+}$) is an essential component to lower the glass melting temperature, to lower the glass liquid phase temperature, to stabilize the glass, to improve the strength of the glass, etc. However, if the content of $R'^{2+}$ is less than 5%, no sufficient effect will be obtained, and if the content of $R'^{2+}$ exceeds 30%, problems result such that the glass tends to be unstable, the infrared cutting performance deteriorates, the strength of the glass deteriorates, etc. The content of $R'^{2+}$ is more preferably from 5 to 28%, further preferably from 5 to 26%, further more preferably from 6 to 25%, most preferably from 6 to 24%.

Although not an essential component, $Mg^{2+}$ is a component to lower the glass melting temperature, to lower the glass liquid phase temperature, to stabilize the glass, to improve the strength of the glass, etc. The content of $Mg^{2+}$ is preferably from 1 to 30%. If the content of $Mg^{2+}$ is less than 1%, no sufficient effect will be obtained, and if the content of $Mg^{2+}$ exceeds 30%, the glass tends to be unstable, such being undesirable. The content of $Mg^{2+}$ is more preferably from 1 to 25%, further preferably from 1 to 20%.

Although not an essential component, $Ca^{2+}$ is a component to lower the glass melting temperature, to lower the glass liquid phase temperature, to stabilize the glass, to improve the strength of the glass, etc. The content of $Ca^{2+}$ is preferably from 1 to 30%. If the content of $Ca^{2+}$ is less than 1%, no sufficient effect will be obtained, and if the content of $Ca^{2+}$ exceeds 30%, the glass tends to be unstable, such being undesirable. The content of $Ca^{2+}$ is more preferably from 1 to 25%, further preferably from 1 to 20%.

Although not an essential component, $Sr^{2+}$ is a component to lower the glass melting temperature, to lower the glass liquid phase temperature, to stabilize the glass, etc. The content of $Sr^{2+}$ is preferably from 1 to 30%. If the content of $Sr^{2+}$ is less than 1%, no sufficient effect will be obtained, and if the content of $Sr^{2+}$ exceeds 30%, the glass tends to be unstable, such being undesirable. The content of $Sr^{2+}$ is more preferably from 1 to 25%, further preferably from 1 to 20%.

Although not an essential component, $Ba^{2+}$ is a component to lower the glass melting temperature, to lower the glass liquid phase temperature, to stabilize the glass, etc. The content of $Ba^{2+}$ is preferably from 1 to 30%. If the content of $Ba^{2+}$ is less than 1%, no sufficient effect will be obtained, and if the content of $Ba^{2+}$ exceeds 30%, the glass tends to be unstable, such being undesirable. The content of $Sr^{2+}$ is more preferably from 1 to 25%, further preferably from 1 to 20%.

Although not an essential component, $Zn^{2+}$ is a component to lower the glass melting temperature, to lower the glass liquid phase temperature, etc. The content of $Zn^{2+}$ is preferably from 1 to 30%. However, if the content of $Zn^{2+}$ is less than 1%, no sufficient effect will be obtained, and if the content of $Zn^{2+}$ exceeds 30%, the melting property of the glass deteriorates, such being undesirable. The content of $Zn^{2+}$ is more preferably from 1 to 25%, further preferably from 1 to 20%.

$Cu^{2+}$ is an essential component for near infrared cutting. However, if the content of $Cu^{2+}$ is less than 0.1%, no sufficient effect will be obtained when the thickness of the glass is made to be thin. Further, if the content of $Cu^{2+}$ exceeds 15%, the visible transmittance tends to be decreased, such being undesirable. The content of $Cu^{2+}$ is more preferably from 0.1 to 12%, further preferably from 0.2 to 10%, furthermore preferably from 0.5 to 10%.

Further, the total amount of Cu is the total amount of Cu including monovalent, bivalent and other valencies and represented by wt %. When the glass of the present invention is 100 wt %, the content of the total amount of Cu is preferably within a range of from 0.1 to 15 wt % in the glass. Similarly to the above mentioned $Cu^{2+}$, if the total amount of Cu is less than 0.1 wt %, when the glass is made to be thin, the near infrared cutting performance tends not to be sufficiently obtained, and if the total amount of Cu exceeds 15%, the visible light transmittance deteriorates. Further, the content of $Cu^+$ represented by wt % may be limited so that ($Cu^+$/the total amount of Cu)×100[%] would be from 0.01 to 4.0%.

Further, even though the thickness of the near infrared cutoff filter glass of the present invention is thin, good spectral properties can be obtained so as to comply with the miniaturization and the thickness-reduction of imaging devices and other mounting devices. In the case of the flat shape glass plate, the thickness of the glass is preferably less than 1 mm, more preferably less than 0.8 mm, further preferably less than 0.6 mm, most preferably less than 0.4 mm. Further, the lower limit of the thickness of the glass is not particularly restricted, however, considering the strength so that the glass would not be broken at a time of producing glass or incorporating the glass into an imaging device, the lower limit of the thickness is preferably at least 0.1 mm.

Although not an essential component, $Sb^{3+}$ has an effect to increase the visible transmittance by improving the oxidation property of the glass and suppressing the concentration of $Cu^+$ ions from increasing. However, if the content of $Sb^{3+}$ exceeds 1%, the stability of the glass tends to deteriorate, such being undesirable. The content of $Sb^{3+}$ is preferably from 0 to 1%, more preferably from 0.01 to 0.8%, further preferably from 0.05 to 0.5%, most preferably from 0.1 to 0.3%.

$O^{2-}$ is an essential component to stabilize the glass, to increase the visible transmittance, to improve mechanical properties such as strength, hardness and elasticity, to decrease UV transmittance, etc. However, if the content of $O^{2-}$ is less than 30%, no sufficient effect will be obtained, and if the content of $O^{2-}$ exceeds 90%, the glass tends to be unstable, and the weather resistance thereby deteriorates, such being undesirable. The content of $O^{2-}$ is more preferably from 30 to 80%, further preferably from 30 to 75%.

$F^-$ is an essential component to stabilize the glass and to improve the weather resistance. However, if the content of $F^-$ is less than 10%, no sufficient effects will be obtained, and if the content of $F^-$ exceeds 70%, the visible transmittance is decreased, mechanical properties such as strength, hardness and elasticity deteriorate, and the UV transmittance is increased, such being undesirable. It is more preferably from 10 to 60%, further more preferably from 15 to 60%.

The glass of the present invention preferably contains substantially no PbO, $As_2O_3$, $V_2O_5$, $LaY_3$, $YF_3$, $YbF_3$ nor $GdF_3$. PbO is a component to lower the viscosity of glass and to improve the production workability. Further, $As_2O_3$ is a component which acts as an excellent fining agent which can form a fining gas in a wide temperature range. However, as PbO and $As_2O_3$ are environmental load substances, they are preferably not contained as far as possible. As $V_2O_5$ has absorption in the visible region, it is preferably not contained as far as possible in a near infrared cut filter glass for a solid state imaging sensor for which a high visible light transmittance is required. Each of $LaY_3$, $YF_3$, $YbF_3$ and $GdF_3$ is a component to stabilize glass, however, their materials are relatively expensive, thus leading to an increase in the cost, and accordingly they are preferably not contained as far as possible. Here, "containing substantially no" means that such components are not intentionally used as materials, and inevitable impurities included from the material components or in the production step are considered to be not contained.

The glass of the present invention may contain a nitrate compound or a sulfate compound having cation to form glass as an oxidizing agent or a fining agent. The oxidizing agent has an effect to control ($Cu^+$/the total amount of Cu) in the Cu component in the glass to the desired range. The amount of addition of the nitrate compound or the sulfate compound is preferably from 0.5 to 10 mass % by the outer percentage based on the total amount of the material mixture for the above glass composition. If the addition amount is less than 0.5 mass %, no effect of improving the transmittance will be obtained, and if it exceeds 10 mass %, formation of glass tends to be difficult. It is more preferably from 1 to 8 mass %, further preferably from 3 to 6 mass %. The nitrate compound may, for example, be $Al(NO_3)_3$, $LiNO_3$, $NaNO_3$, $KNO_3$, $Mg(NO_3)_2$, $Ca(NO_3)_2$, $Sr(NO_3)_2$, $Ba(NO_3)_2$, $Zn(NO_3)_2$ or $Cu(NO_3)_2$. The sulfate compound may, for example, be $Al_2(SO_4)_3 \cdot 16H_2O$, $Li_2SO_4$, $Na_2SO_4$, $K_2SO_4$, $MgSO_4$, $CaSO_4$, $SrSO_4$, $BaSO_4$, $ZnSO_4$ or $CuSO_4$.

The glass of the present invention may be provided with an optical thin film such as an antireflection film, an infrared cutting film or a UV and infrared cutting film on its surface. Such an optical film is a monolayer film or a multilayer film and may be formed by a known method such as vapor deposition method or a sputtering method.

The near infrared cutoff filter glass of the present invention can be prepared as follows. First, the raw materials are weighed and mixed so that glass to be obtained has a composition within the above range. This raw material mixture is charged into a platinum crucible and melted by heating at a temperature of from 700 to 1,000° C. in an electric furnace. The molten glass is sufficiently stirred and fined, cast into a mold, annealed, and then cut and polished to be formed into a flat plate having a predetermined thickness. In the above production process, the highest temperature of glass in a molten state is preferably at most 950° C. If the temperature of glass in a molten state exceeds 950° C., problems result such that the equilibrium state of oxidation-reduction of Cu ions will be inclined to $Cu^+$ side, whereby the transmittance characteristics will be deteriorated, and volatilization of fluorine will be accelerated and glass tends to be unstable. Thus, the melting temperature is more preferably at most 900° C., most preferably at most 850° C. Further, if the highest temperature of glass in a molten state is too low, problems result such that crystallization occurs during melting the glass, and it will take long until complete melting. The highest temperature of glass in a molten state is preferably at least 700° C., more preferably at least 750° C.

EXAMPLES

Examples of the present invention and Comparative Examples are shown in Tables 1 to 3. Examples 1, 2 and 4 to 17 are working examples of the present invention, and Examples 3 and 18 are comparative examples of the present invention.

Such glasses were obtained in such a manner that materials were weighed and mixed to achieve compositions (cation percentage, anion percentage) as identified in Tables 1 to 3, put in a platinum crucible having an internal capacity of about 400 cc and melted for 2 hours at a melting temperature mentioned in Tables. Then, the molten glass was clarified, stirred, cast into a rectangular mold of 50 mm in length x 50 mm in width and 20 mm in height preheated to from 300 to 500° C., and annealed at about 1° C./min to obtain glass samples. Here, in Tables 1 to 3, $Cu^+$ and the total amount of Cu are represented by wt %.

With respect to the melting properties, etc. of the glass, the above samples were visually observed when prepared, and the obtained glass samples were confirmed to have no bubbles or striae.

As materials of each glass, $H_3PO_4$ and/or $Al(PO_3)_3$ was used in the case of $P^{5+}$, $AlF_3$ and/or $Al(PO_3)_3$ was used in the case of $Al^{3+}$, LiF and/or $LiNO_3$ was used in the case of $Li^+$, $MgF_2$ and/or $MgO$ was used in the case of $Mg^{2+}$, $SrF_2$ and/or $SrCO_3$ was used in the case of $Sr^{2+}$, $BaF_2$ and/or $BaCO_3$ was used in the case of $Ba^{2+}$, a fluoride was used in the case of $Na^+$, $K^+$, $Ca^{2+}$, $Zn^{2+}$ and $Y^{3+}$ and CuO was used in the case of $Cu^{2+}$.

TABLE 1

| Cation % or Anion % | Ex. 1 | Ex. 2 | Ex. 3 | Ex. 4 | Ex. 5 | Ex. 6 |
|---|---|---|---|---|---|---|
| $P^{5+}$ | 38.7 | 38.7 | 43.2 | 38.7 | 38.7 | 38.7 |
| $Al^{3+}$ | 8.1 | 8.1 | 9.1 | 9.6 | 10.1 | 11.1 |
| $Li^+$ | 21.6 | 21.6 | 30.4 | 21.6 | 21.6 | 21.6 |
| $Na^+$ | 14.8 | 14.8 | 0.0 | 13.3 | 12.8 | 11.8 |
| $K^+$ | 0.0 | 0.0 | 0.0 | 0.0 | 0.0 | 0.0 |
| $R^+$ | 36.4 | 36.4 | 30.4 | 34.9 | 34.4 | 33.4 |
| $Mg^{2+}$ | 2.9 | 2.9 | 0.0 | 0.0 | 0.0 | 0.0 |
| $Ca^{2+}$ | 4.0 | 4.0 | 4.5 | 4.0 | 4.0 | 4.0 |
| $Sr^{2+}$ | 0.0 | 0.0 | 2.5 | 2.9 | 2.9 | 2.9 |
| $Ba^{2+}$ | 5.1 | 5.1 | 5.8 | 5.0 | 5.0 | 5.0 |
| $Zn^{2+}$ | 0.0 | 0.0 | 0.0 | 0.0 | 0.0 | 0.0 |
| $R^{2+}$ | 12.0 | 12.0 | 12.8 | 11.9 | 11.9 | 11.9 |
| $Cu^{2+}$ | 4.8 | 4.8 | 4.5 | 4.9 | 4.9 | 4.9 |
| $Sb^{3+}$ | 0.0 | 0.0 | 0.0 | 0.0 | 0.0 | 0.0 |
| $O^{2-}$ | 62.3 | 62.3 | 61.1 | 62.0 | 61.4 | 60.4 |
| $F^-$ | 37.7 | 37.7 | 38.9 | 38.0 | 38.6 | 39.6 |
| $Cu^+$ (wt %) | 0.03 | 0.04 | 0.23 | 0.04 | 0.05 | 0.05 |
| Total amount of Cu (wt %) | 5.46 | 5.40 | 5.22 | 5.39 | 5.40 | 5.34 |
| ($Cu^+$/total amount of Cu) × 100 [%] | 0.5 | 0.7 | 4.4 | 0.7 | 0.9 | 0.9 |
| Melting temperature [° C.] | 830 | 820 | 880 | 820 | 830 | 830 |
| 400 nm transmittance [%] | 87.5 | 88.5 | 82.9 | 87.2 | 87.3 | 87.2 |
| Absorption coefficient (wavelength of 400 nm) [$mm^{-1}$] | 0.06 | 0.05 | 0.13 | 0.07 | 0.06 | 0.07 |
| Absorption coefficient (wavelength of 800 nm) [$mm^{-1}$] | 6.85 | 6.95 | 7.32 | 7.21 | 7.05 | 6.99 |
| Absorption coefficient (wavelength of 400 nm)/ Absorption coefficient (wavelength of 800 nm) | 0.009 | 0.007 | 0.018 | 0.010 | 0.009 | 0.010 |
| Weather resistance | ◯ | ◯ | ◯ | ◯ | ◯ | ◯ |

TABLE 2

| Cation % or Anion % | Ex. 7 | Ex. 8 | Ex. 9 | Ex. 10 | Ex. 11 | Ex. 12 |
|---|---|---|---|---|---|---|
| $P^{5+}$ | 43.1 | 44.3 | 39.7 | 43.3 | 43.3 | 30.8 |
| $Al^{3+}$ | 9.1 | 9.3 | 11.4 | 9.1 | 9.1 | 11.5 |
| $Li^+$ | 30.2 | 24.7 | 22.2 | 30.5 | 30.5 | 30.0 |
| $Na^+$ | 0.0 | 0.0 | 12.1 | 0.0 | 0.0 | 0.0 |
| $K^+$ | 0.0 | 0.0 | 0.0 | 0.0 | 0.0 | 0.0 |
| $R^+$ | 30.2 | 24.7 | 34.3 | 30.5 | 30.5 | 30.0 |
| $Mg^{2+}$ | 0.0 | 3.4 | 0.0 | 0.0 | 0.0 | 1.5 |
| $Ca^{2+}$ | 4.4 | 4.6 | 4.1 | 4.5 | 4.5 | 4.5 |
| $Sr^{2+}$ | 2.5 | 5.7 | 3.0 | 2.6 | 2.6 | 2.5 |
| $Ba^{2+}$ | 5.7 | 5.9 | 5.1 | 5.8 | 5.8 | 15.0 |
| $Zn^{2+}$ | 0.0 | 0.0 | 0.0 | 0.0 | 0.0 | 0.0 |
| $R^{2+}$ | 12.6 | 19.6 | 12.2 | 12.9 | 12.9 | 23.5 |
| $Cu^{2+}$ | 5.0 | 2.1 | 2.4 | 4.2 | 4.2 | 4.2 |
| $Sb^{3+}$ | 0.0 | 0.0 | 0.0 | 0.0 | 0.0 | 0.0 |
| $O^{2-}$ | 61.2 | 57.9 | 60.0 | 59.4 | 59.4 | 44.4 |
| $F^-$ | 38.8 | 42.1 | 40.0 | 40.6 | 40.6 | 55.6 |
| $Cu^+$ (wt %) | 0.09 | 0.05 | 0.04 | 0.04 | 0.10 | 0.05 |
| Total amount of Cu (wt %) | 5.64 | 2.37 | 2.94 | 4.95 | 4.99 | 4.19 |
| ($Cu^+$/total amount of Cu) × 100 [%] | 1.6 | 2.1 | 1.4 | 0.8 | 2.0 | 1.2 |
| Melting temperature [° C.] | 850 | 900 | 820 | 820 | 900 | 820 |
| 400 nm transmittance [%] | 85.2 | 89.7 | 90.2 | 87.9 | 83.3 | 87.3 |
| Absorption coefficient (wavelength of 400 nm) [$mm^{-1}$] | 0.08 | 0.01 | 0.02 | 0.04 | 0.12 | 0.05 |
| Absorption coefficient (wavelength of 800 nm) [$mm^{-1}$] | 7.82 | 3.89 | 3.90 | 6.66 | 6.73 | 5.66 |

TABLE 2-continued

| Cation % or Anion % | Ex. 7 | Ex. 8 | Ex. 9 | Ex. 10 | Ex. 11 | Ex. 12 |
|---|---|---|---|---|---|---|
| Absorption coefficient (wavelength of 400 nm)/ Absorption coefficient (wavelength of 800 nm) | 0.010 | 0.003 | 0.005 | 0.006 | 0.018 | 0.009 |
| Weather resistance | ◯ | ◯ | ◯ | ◯ | ◯ | ◯ |

TABLE 3

| Cation % or Anion % | Ex. 13 | Ex. 14 | Ex. 15 | Ex. 16 | Ex. 17 | Ex. 18 |
|---|---|---|---|---|---|---|
| $P^{5+}$ | 38.8 | 38.8 | 38.2 | 44.2 | 44.2 | 44.2 |
| $Al^{3+}$ | 8.1 | 8.1 | 9.5 | 6.4 | 6.4 | 9.3 |
| $Li^+$ | 21.6 | 21.6 | 21.3 | 0.0 | 0.0 | 24.5 |
| $Na^+$ | 14.8 | 14.8 | 13.1 | 24.2 | 24.2 | 0.0 |
| $K^+$ | 0.0 | 0.0 | 0.0 | 0.0 | 0.0 | 0.0 |
| $R^+$ | 36.4 | 36.4 | 34.4 | 24.2 | 24.2 | 24.5 |
| $Mg^{2+}$ | 2.9 | 2.9 | 0.0 | 11.7 | 11.7 | 3.3 |
| $Ca^{2+}$ | 4.0 | 4.0 | 3.9 | 4.0 | 4.0 | 4.5 |
| $Sr^{2+}$ | 0.0 | 0.0 | 2.9 | 3.0 | 3.0 | 5.6 |
| $Ba^{2+}$ | 5.1 | 5.1 | 5.0 | 3.9 | 3.9 | 5.8 |
| $Zn^{2+}$ | 0.0 | 0.0 | 0.0 | 0.0 | 0.0 | 0.0 |
| $R^{2+}$ | 12.0 | 12.0 | 11.8 | 22.6 | 22.6 | 19.2 |
| $Cu^{2+}$ | 4.7 | 4.7 | 6.1 | 2.6 | 2.6 | 2.8 |
| $Sb^{3+}$ | 0.0 | 0.0 | 0.0 | 0.0 | 0.0 | 0.0 |
| $O^{2-}$ | 56.3 | 56.3 | 56.0 | 65.7 | 65.7 | 58.0 |
| $F^-$ | 43.7 | 43.7 | 44.0 | 34.3 | 34.3 | 42.0 |
| $Cu^+$ (wt %) | 0.06 | 0.08 | 0.08 | 0.05 | 0.08 | 0.18 |
| Total amount of Cu (wt %) | 5.32 | 5.39 | 7.02 | 2.82 | 2.90 | 3.02 |
| ($Cu^+$/total amount of Cu) × 100 [%] | 1.1 | 1.5 | 1.1 | 1.8 | 2.8 | 6.0 |
| Melting temperature [° C.] | 820 | 860 | 800 | 900 | 950 | 1000 |
| 400 nm transmittance [%] | 86.7 | 85.1 | 84.6 | 88.3 | 86.2 | 79.3 |
| Absorption coefficient (wavelength of 400 nm) [$mm^{-1}$] | 0.08 | 0.10 | 0.11 | 0.04 | 0.07 | 0.19 |
| Absorption coefficient (wavelength of 800 nm) [$mm^{-1}$] | 7.21 | 7.55 | 8.88 | 3.94 | 4.07 | 4.28 |
| Absorption coefficient (wavelength of 400 nm)/ Absorption coefficient (wavelength of 800 nm) | 0.011 | 0.013 | 0.012 | 0.010 | 0.017 | 0.044 |
| Weather resistance | ◯ | ◯ | ◯ | ◯ | ◯ | ◯ |

The $Cu^+$/the total amount of Cu, the transmittance (plate thickness: 0.3 mm) at a wavelength of 400 nm, the absorption coefficient (wavelength of 400 nm and wavelength of 800 nm) and the weather resistance of the glass prepared as described above were evaluated or calculated by the following methods.

The transmittance was evaluated by means of a UV-visible/NIR spectrophotometer (tradename: V-570, manufactured by JASCO Corporation). Specifically, a flat shape glass sample of 40 mm in length×30 mm in wide×0.3 mm in thickness of which both surfaces were optically polished was prepared, and the transmittance was measured.

With respect to the weather resistance, using a high temperature and high humidity bath (tradename: SH-221, manufactured by ESPEC CORP.), the optically polished glass sample was maintained in the high temperature and high humidity bath at 65° C. under a relative humidity of 93% for 500 hours, whereupon the state of stain on the glass surface was visually observed, and a case where no stain observed was regarded as ◯ (namely, no problem in weather resistance).

With respect to the absorption coefficient, the transmittances at a wavelength of 400 nm and at a wavelength of 800 nm, of the above-mentioned glass sample were measured by means of the UV-visible light/NIR spectrophotometer and obtained by calculation subtracting the reflection loss of a top surface and a back surface. The value of the transmittance was converted so as to be a value of a thickness of 0.3 mm. The conversion for the plate thickness was calculated by the following formula 1. Here, $T_{i1}$ is a transmittance of a measured sample, $t_1$ is a thickness of a measured sample, $T_{i2}$ is a converted value of a transmittance, and $t_2$ is a thickness to be converted (0.3 in the present invention).

[Formula 1]

$$T_{i2} = T_{i1}^{\frac{t_2}{t_1}} \quad \text{Formula 1}$$

With respect to the Cu component in the glass, the amount of $Cu^+$ was measured by the oxidation-reduction titration method, and the total amount of Cu was measured by the ICP spectrometry (apparatus: ICPE-9000, manufactured by Shimadzu Corporation). The oxidation-reduction titration method for measuring the amount of $Cu^+$ in the Cu component in the glass was carried out by the following procedures (1) to (4).

(1) As a reagent, in Ex. 1 to 3, a mixed liquid containing 5 ml of N/15 $NaVO_3$, 20 ml of HF and 3 ml of (1+1)$H_2SO_4$ ((1+1)H2SO4 is sulfuric acid solution containing one of H$_2$O to one of H$_2$SO$_4$ in the volume proportion) is prepared. As a reagent, in Ex. 4 to 18, a mixed solution containing 5 ml of N/60 NaVO3, 20 ml of HF and 3 ml of (1+1)H$_2$SO$_4$ is prepared. Then, a platinum container (A) in which the reagent and 0.5 g of the glass sample to be measured are added and a platinum container (B) in which only the reagent is added, are prepared respectively.

(2) The platinum container (A) and (B) are heated respectively, and in the case of the platinum container (A), the glass sample is thermally decomposed. By the thermal decomposition, Cu$^+$ in the glass sample reacts with VO$_3^-$ in the reagent at 1:1, and Cu$^{2+}$ and VO$^{2+}$ are thereby formed. The heating is carried out by gradually raising temperature from about 150° C. and finally heated at from 250 to 300° C. (heating is from 2 to 3 hours). During the thermal decomposition of the glass sample, Cu$^+$ in the glass is oxidized to Cu$^{2+}$ by VO$_3^-$ (VO$_3^-$ is reduced to VO$^{2+}$). After the thermal decomposition of the glass sample, each solution in the platinum container is transferred to a beaker by using (1+100)H$_2$SO$_4$ ((1+100)H$_2$SO$_4$ is sulfuric acid solution containing 100 of H$_2$O to 1 of H$_2$SO$_4$ in the volume proportion) so as to be about 250 ml.

(3) VO$_3^-$ in each of the transferred solution from the platinum container (A) or (B) is subjected to the oxidation-reduction titration by using N/60 FeSO$_4$ in Ex. 1 to 3 and by using N/240 FeSO$_4$ in Ex. 4 to 18. In Ex. 1 to 3, the dropped amount of N/60 FeSO$_4$ required for reducing VO$_3^-$ to VO$^{2+}$ is obtained, and in Ex. 4 to 18, the dropped amount of N/240 FeSO$_4$ required for reducing VO$_3^-$ to VO$^{2+}$ is obtained. For the titration, a titrator (for example an automatic titrator: COM-1600, manufactured by Hiranuma Sangyo Co., Ltd.) is used. Here, Fe$^{2+}$ in the reducing agent reacts with VO$_3^-$ in the sulfuric acid solution at 1:1, and thereby Fe$^{3+}$ and VO$^{2+}$ are formed.

(4) [The dropped amount of the solution transferred from the platinum container (B)]−[the dropped amount of the solution transferred the platinum container (A)]=[the amount of VO$_3^-$ consumed by the reaction with Cu$^+$ in the glass sample]. As described above, Cu$^+$ in the glass sample reacts with VO$_3^-$ in the reaction agent at 1:1. Thus, the amount of Cu$^+$ in the glass sample is estimated from the consumed amount of VO$_3^-$.

It is evident from the results of the evaluations that the glass in working examples can be appropriately used as a near infrared cutoff filter glass for a solid state imaging sensor, since the (Cu$^+$/the total amount of Cu)×100[%] is within a range of from 0.01 to 4.0%, the numerical value obtained by dividing the absorption coefficient at a wavelength of 400 nm by the absorption coefficient at a wavelength of 800 nm is within a range of from 0.00001 to 0.02, and in a thickness of 0.3 mm, the spectral transmittance at a wavelength of 400 nm is from 83 to 92%, whereby the transmittance of a glass to light in a visible range is high.

INDUSTRIAL APPLICABILITY

According to the present invention, even though the content of the Cu component is large for forming a thin plate, the transmittance of the glass to light in a visible range is high, whereby the glass is extremely useful as an application of a near infrared cutoff filter glass for an imaging device being miniaturized and made to be thin.

What is claimed is:

1. A near infrared cutoff filter glass comprising components of P, F, Al, R, R' and Cu, wherein R is at least one member selected from Li, Na and K, R' is at least one member selected from Mg, Ca, Sr, Ba and Zn, the near infrared cutoff filter glass comprises, as represented by cation %:
  $P^{5+}$: from 38.2 to 50%;
  $Al^{3+}$: from 5 to 15%;
  $R^+$: from 20 to 40%, wherein $R^+$ is the total amount of Li$^+$, Na$^+$ and K$^+$;
  $R'^{2+}$: from 5 to 30%, wherein $R'^{2+}$ is the total amount of Mg$^{2+}$, Ca$^{2+}$, Sr$^{2+}$, Ba$^{2+}$ and Zn$^{2+}$;
  $Cu^{2+}$: from 0.1 to 15%; and
  $Sb^{3+}$: from 0 to 1%, and as represented by anion %:
  $O^{2-}$: from 30 to 90%; and
  $F^-$: from 10 to 70%, and
  a ratio of an amount of Cu$^+$ to a total amount of Cu (Cu$^+$/the total amount of Cu) is within a range of from 0.01 to 4.0%.

2. The near infrared cutoff filter glass according to claim 1, wherein a content of Al$^{3+}$ is from 7 to 11.5%.

3. The near infrared cutoff filter glass according to claim 1, wherein a content of Li$^+$ is at most 21.3%.

4. The near infrared cutoff filter glass according to claim 1, wherein the ratio of the amount of Cu$^+$ to the total amount of Cu (Cu$^+$/the total amount of Cu) is within a range of from 0.01 to 2.5%.

5. The near infrared cutoff filter glass according to claim 1, wherein the ratio of the amount of Cu$^+$ to the total amount of Cu (Cu$^+$/the total amount of Cu) is within a range of from 0.01 to 1.5%.

6. The near infrared cutoff filter glass according to claim 1, wherein a value obtained by dividing an absorption coefficient at a wavelength of 400 nm of the near infrared cutoff filter glass by an absorption coefficient at a wavelength of 800 nm of the near infrared cutoff glass is within a range of from 0.00001 to 0.02.

7. The near infrared cutoff filter glass according to claim 1, wherein a value obtained by dividing an absorption coefficient at a wavelength of 400 nm of the near infrared cutoff filter glass by an absorption coefficient at a wavelength of 800 nm of the near infrared cutoff glass is within a range of from 0.001 to 0.02.

8. The near infrared cutoff filter glass according to claim 1, wherein a value obtained by dividing an absorption coefficient at a wavelength of 400 nm of the near infrared cutoff filter glass by an absorption coefficient at a wavelength of 800 nm of the near infrared cutoff glass is within a range of from 0.003 to 0.016.

9. The near infrared cutoff filter glass according to claim 1, wherein in a thickness of 0.3 mm, the spectral transmittance at a wavelength of 400 nm of the near infrared cutoff filter glass is from 83 to 92%.

10. The near infrared cutoff filter glass according to claim 1, wherein in a thickness of 0.3 mm, the spectral transmittance at a wavelength of 400 nm of the near infrared cutoff filter glass is from 85 to 90%.

* * * * *